US012715738B2

(12) United States Patent
Christen et al.

(10) Patent No.: US 12,715,738 B2
(45) Date of Patent: Aug. 25, 2026

(54) PROTECTIVE ROOF WITH AN ADJUSTABLE WIDTH AND DEPTH FOR INSTALLING IN AN ELEVATOR SHAFT

(71) Applicant: Inventio AG, Hergiswil (CH)

(72) Inventors: Lukas Christen, Kilchberg (CH); Samuel Ulmer, Lucerne (CH); Stefan Weber, Niederwil AG (CH); Gabriele Bizzozero, Gisikon (CH)

(73) Assignee: INVENTIO AG, Hergiswil (CH)

( * ) Notice: Subject to any disclaimer, the term of this patent is extended or adjusted under 35 U.S.C. 154(b) by 174 days.

(21) Appl. No.: 18/716,973

(22) PCT Filed: Dec. 12, 2022

(86) PCT No.: PCT/EP2022/085300
§ 371 (c)(1),
(2) Date: Jun. 6, 2024

(87) PCT Pub. No.: WO2023/110709
PCT Pub. Date: Jun. 22, 2023

(65) Prior Publication Data

US 2025/0033931 A1 Jan. 30, 2025

(30) Foreign Application Priority Data

Dec. 14, 2021 (EP) .................................... 21214531

(51) Int. Cl.
*B66B 11/00* (2006.01)
*B66B 5/00* (2006.01)
(Continued)

(52) U.S. Cl.
CPC ........ *B66B 11/0005* (2013.01); *B66B 5/0043* (2013.01); *B66B 19/00* (2013.01); *E04G 21/32* (2013.01)

(58) Field of Classification Search
CPC ... B66B 11/0005; B66B 5/0043; B66B 19/00; E04G 21/32
See application file for complete search history.

(56) References Cited

U.S. PATENT DOCUMENTS 7,510,056 B2 * 3/2009 Bonatre ................ B66B 5/0081
187/401
10,836,608 B2 * 11/2020 Peacock .................. B66B 5/005
(Continued)

FOREIGN PATENT DOCUMENTS

EP 3388379 A1 10/2018
JP H1179602 A 3/1999
(Continued)

OTHER PUBLICATIONS

English Translation of International Preliminary Report on Patentability Chapter II for PCT/EP2022/085300 (5 pages). (Year: 2024).*
(Continued)

*Primary Examiner* — Rodney Mintz
(74) *Attorney, Agent, or Firm* — Shumaker, Loop & Kendrick, LLP

(57) ABSTRACT

A protective roof device for installation in an elevator shaft includes: a protective roof support that can be installed in the elevator shaft at different longitudinal positions; a protective roof supported by the support for catching falling objects and having at least two protective roof parts at least partly overlapping in an overlap region, the width of which can be modified by moving the roof parts relative to one another in an x-direction; each of the roof parts being foldable along a folding line and arranged such that the folding lines of different roof parts form a common folding line that is parallel to the x-direction; the width of the protective roof being variable in the x direction by modifying the width of the overlap region; and the depth of the protective roof being
(Continued)

variable modified in a y direction by folding the protective roof along the common folding line.

12 Claims, 3 Drawing Sheets

(51) Int. Cl.
*B66B 19/00* (2006.01)
*E04G 21/32* (2006.01)

(56) References Cited

U.S. PATENT DOCUMENTS

| | | | | |
|---|---|---|---|---|
| 11,299,372 B2 * | 4/2022 | Christen | B66B 11/0005 |
| 11,414,302 B1 * | 8/2022 | De Ledebur | B66B 19/00 |
| 11,548,762 B2 * | 1/2023 | Haapaniemi | B66B 11/0226 |
| 2008/0217113 A1 * | 9/2008 | Bonatre | B66B 5/0081 187/401 |
| 2018/0290863 A1 | 10/2018 | Peacock et al. | |
| 2019/0193995 A1 * | 6/2019 | Christen | B66B 11/0005 |
| 2021/0354955 A1 * | 11/2021 | Haapaniemi | B66B 11/0226 |
| 2025/0376354 A1 * | 12/2025 | Zhang | B66B 11/0246 |

FOREIGN PATENT DOCUMENTS

| | | |
|---|---|---|
| JP | 2003020175 A | 1/2003 |
| JP | 2005138939 A | 6/2005 |
| WO | 2018002132 A1 | 1/2018 |

OTHER PUBLICATIONS

Amendment filed in counterpart European Application No. 22835646.5 (6 pages). (Year: 2026).*

* cited by examiner

PROTECTIVE ROOF WITH AN ADJUSTABLE WIDTH AND DEPTH FOR INSTALLING IN AN ELEVATOR SHAFT

FIELD

The present invention relates to a protective roof device for installation in an elevator shaft of an elevator system. The invention further relates to an elevator system having such a protective roof device.

BACKGROUND

An elevator system is usually used for transporting people or objects between floors of existing buildings. For this purpose, the elevator system can comprise one or more elevator cars which can be moved along an elevator shaft between the floors of the building using suitable support means, for example using one or more cables or one or more belts.

Such an elevator system is usually operated in a finished building. However, it is also possible for the elevator system to be installed and operated already during construction of the building and to grow with the building so to speak. A separate elevator system for transporting people and objects specifically during the construction phase can thus be dispensed with.

For this purpose, for example, drive and control components of the elevator system may be arranged on a lifting platform which may be installed in an already completed part of an elevator shaft that otherwise is still under construction. The lifting platform can then be raised stepwise as the building or elevator shaft rises, for example by means of a crane. The elevator car(s) and the counterweight of the elevator system can be suspended on the lifting platform. Such an elevator system can also be referred to as a climbing elevator system.

In order to protect people on or below the lifting platform from falling objects, the elevator system can have a corresponding protective platform which can be installed in a portion of the elevator shaft located above the lifting platform. Since the lifting platform is generally moved several times during construction of the building, the effort required for installing and removing the protective platform should be kept within reasonable limits.

WO 2018/002132 A1 and EP 3 388 379 A1 describe examples of climbing elevator systems having such a protective platform.

SUMMARY

There may be a need for a protective roof device for installation in an elevator shaft which can be adapted with little effort to varying dimensions of the elevator shaft and/or can be positioned with little effort in the longitudinal direction of the elevator shaft.

This need can be met by the subject matter of the advantageous embodiments defined in the following description, as well as the accompanying drawings.

A first aspect of the invention relates to a protective roof device for installation in an elevator shaft of an elevator system. The protective roof device comprises a protective roof support which can be installed in the elevator shaft in different positions in the longitudinal direction of the elevator shaft, and a protective roof supported by the protective roof support for catching objects falling down the elevator shaft. The protective roof comprises at least two protective roof parts which overlap at least partially in an overlap region, the width of which can be changed and adapted to the elevator shaft by displacing the protective roof parts relative to one another in an x-direction. The protective roof parts are each foldable along at least one fold line and arranged such that the fold lines of different protective roof parts form at least one common fold line which is parallel to the x-direction. The protective roof can be changed, and adapted to the elevator shaft, in terms of its width in the x-direction by changing the width of the overlap region, and in terms of its depth in a y-direction orthogonal to the x-direction by folding the protective roof, i.e., each protective roof part, along the common fold line.

The overlap region can also have a width of zero. In this specific case, the protective roof parts do not necessarily have to overlap. For example, the protective roof parts can then abut one another without overlapping.

The protective roof device can, for example, be designed for temporary installation in the elevator shaft of a building that has not yet been completed. In other words, the protective roof device can be installable in an elevator shaft that is under construction and has not yet reached its final length. In that case, the protective roof device can be raised as the elevator shaft rises, i.e., can be adjusted gradually in terms of its height. The purpose of the protective roof device is to protect people, or material, located in an already completed part of the elevator shaft during construction from falling objects, rubble, rain, etc. For that purpose, the protective roof should have a certain stability in order to be able to reliably catch even heavier objects. Furthermore, it is expedient if the protective roof device covers the elevator shaft as extensively as possible.

Depending on the number of floors in the building, the protective roof device may have to be moved very frequently in the longitudinal direction of the elevator shaft. Also, the dimensions of the elevator shaft may change depending on its length. Now, the protective roof device presented here allows for a simple adaptation of the dimensions of the protective roof to changing dimensions of the (same) elevator shaft or to dimensions of different elevator shafts in just a few steps. As a result, the (dis) mounting effort when moving the protective roof device in the longitudinal direction of the elevator shaft and/or when installing it in different elevator shafts can be considerably reduced.

A second aspect of the invention relates to an elevator system. The elevator system comprises an elevator shaft and a protective roof device as described above and below. The protective roof support of the protective roof device is installed in the elevator shaft in one of several possible positions in the longitudinal direction of the elevator shaft. The width and/or depth of the protective roof of the protective roof device can be adapted to a width and/or depth of the elevator shaft such that objects falling in the elevator shaft are caught by the protective roof. That way, people or material located below the protective roof, for example in an already completed part of the elevator shaft that otherwise is still under construction, can be effectively protected from the falling objects.

The elevator system can be implemented, for example, as a so-called climbing elevator system (see above). The protective roof support can be displaceably mounted in the longitudinal direction of the elevator shaft in a rail system anchored in the elevator shaft. Such a rail system can comprise, for example, one or more guide rails for guiding one or more elevator cars of the elevator system. For example, this/these guide rail(s) can at the same time serve for guiding and/or fastening the protective roof support. The height of the entire protective roof device can thus be adjusted and/or fixed very easily.

In order to ensure that the protective roof covers the elevator shaft as extensively as possible, the protective roof can extend around the rail system, for example around the guide rail(s). In other words, the rail system can be guided through the protective roof, wherein the protective roof can be displaceable relative to the rail system in the longitudinal direction of the elevator shaft. For that purpose, the protective roof can be designed to have one or more openings or recesses (see further below).

Without restricting the scope of the invention in any way, embodiments of the invention may be considered to be based, among other things, on the concepts and findings described below.

According to one embodiment, the protective roof can comprise, as protective roof parts, two outer protective roof parts and a central protective roof part arranged between the two outer protective roof parts. Each outer protective roof part can overlap with the central protective roof part at least partially in an overlap region, the width of which can be changed by displacing the outer protective roof part relative to the central protective roof part in the x-direction. The protective roof parts can, for example, be pushed one over the other and/or into one another. In the simplest case, the protective roof parts can, for example, be placed loosely on top of one another so as to overlap partially in order to avoid gaps between the protective roof parts through which smaller objects, rubble particles, water, etc. could reach the underlying part of the elevator shaft. The central protective roof part can, for example, be fixed in the x-direction. In that case, the width of the protective roof can be adapted by displacing one or both of the outer protective roof parts, wherein the respective overlap region becomes correspondingly larger or smaller.

According to one embodiment, the protective roof parts can each be foldable along at least a first fold line, a second fold line and a third fold line, and can be arranged such that the first fold lines of different protective roof parts form a first common fold line, the second fold lines of different protective roof parts form a second common fold line, and the third fold lines of different protective roof parts form a third common fold line, wherein each common fold line is parallel to the x-direction. The depth of the protective roof can then be modifiable by folding the protective roof along the first common fold line, the second common fold line and/or the third common fold line. In other words, the three (or more than three) common fold lines can divide the protective roof into four (or more than four) segments, namely into two outer segments and two inner segments that lie between the two outer segments. If the two outer segments are moved flat toward one another, this causes the inner segments to be folded over at the corresponding fold lines, i.e., to raise, and vice versa. The inner segments aligned obliquely in such a way can, for example, be suitable for deflecting objects, which fall onto them, in a certain direction.

According to one embodiment, the protective roof support can be designed to be displaceably mounted in a rail system in the elevator shaft in the longitudinal direction of the elevator shaft. The height of the protective roof device can thus be easily adapted, for example to an increasing length of the elevator shaft during construction. It is particularly advantageous if the same (guide) rails used for guiding the elevator car(s) of the elevator are used for guiding the protective roof support. However, separate rails for guiding the protective roof support are also feasible.

According to one embodiment, the protective roof support can comprise at least two guide shoes for displaceably mounting the protective roof support in the rail system. The protective roof can cover at least an interspace between the guide shoes. The guide shoes can, for example, be designed to guide the protective roof support between two parallel guide rails of the rail system. The guide shoes can lie opposite one another in the x- or y-direction at a certain distance, which can correspond, for example, to a distance between the two guide rails. This interspace can be covered completely or for the most part by the protective roof, i.e., by one or more of the protective roof parts, in order to prevent objects from being able to fall down between the guide shoes.

According to one embodiment, the first common fold line, the second common fold line and the third common fold line can each run through the interspace between the guide shoes. For example, the distance between the guide shoes, i.e., the width of the interspace, can be significantly greater than a respective distance between the guide shoes and an adjacent wall of the elevator shaft. In that case, it is advantageous if the protective roof can be folded in this intermediate region as this region provides the most space for folding the protective roof. Furthermore, this embodiment makes it possible to easily adapt the depth of the protective roof to track width changes of the rail system, i.e., to changes in a distance between the guide rails or shoes.

According to one embodiment, the guide shoes can be connected to one another via at least one cross member. The cross member can support a protective roof platform, wherein the protective roof can rest on the protective roof platform. The cross member can rigidly connect the two guide shoes to one another and can be designed to be correspondingly stable. The protective roof platform can, for example, be a frame-like and/or grid-like structure and/or an assembly of several parallel longitudinal members which can be installed on the cross member, for example screwed or welded thereto. For example, the protective roof can rest loosely on the protective roof platform. Once its width and/or depth has been adapted, the protective roof adapted in this way can be fixable to the protective roof platform in a suitable manner, for example via a suitable quick clamping mechanism and/or by screwing. Such a protective roof support is stable and can be implemented with little design effort.

According to one embodiment, the protective roof parts can each be foldable along at least a fourth and a fifth fold line, and can be arranged such that the fourth fold lines of different protective roof parts form a fourth common fold line and the fifth fold lines of different protective roof parts form a fifth common fold line, wherein each common fold line is parallel to the x-direction.

The depth of the protective roof can then be modifiable by folding the protective roof along the fourth common fold line and/or the fifth common fold line, whereby at least one roof edge that can be joined to a side wall of the elevator shaft, or two roof edges that can be joined to opposite side walls of the elevator shaft can be created. The guide shoes can preferably be arranged in an interspace between the fourth common fold line and the fifth common fold line. In other words, the protective roof can have foldable roof edges. In the installed state of the protective roof device, these roof edges can each rest against a side wall of the elevator shaft, i.e., be supported by the respective side wall, and, depending on the depth of the elevator shaft, i.e., depending on the distance between the two side walls, can be bent to a greater or lesser degree. The protective roof can thus have a trough-shaped cross section. Due to the two roof edges that are angled relative to the rest of the protective roof, objects falling down and onto the roof edges can be deflected, for example, in a controlled manner toward the center of the elevator shaft. Moreover, the force acting on the roof edge when hit by an object is absorbed, on the one hand, by the respective side wall and, on the other hand, by the protective roof support. Such a two-sided support can improve the stability of the protective roof.

According to one embodiment, the protective roof can have at least two guide shoe openings through which one of the guide shoes is guided in each case. The guide shoe openings can be formed so as to additionally receive a guide rail in each case on which the respective guide shoe is displaceably mounted. The guide shoe openings can be the only larger openings of the protective roof or of the relevant protective roof part. The protective roof can thus result in an as extensive as possible covering of the elevator shaft.

According to one embodiment, the central protective roof part can have the guide shoe openings. In other words, the central protective roof part can be positioned in the x- and y-direction via the guide shoe openings and/or can be displaceable in a z-direction, i.e., in the longitudinal direction of the elevator shaft.

According to one embodiment, each protective roof part can comprise at least two separate segments which may be movably connected to one another via a collapse mechanism. The protective roof part can be foldable along the fold line by actuating the collapse mechanism. The segments can be relatively stable board-shaped elements. For example, adjacent segments may be coupled to one another via one or more joints, for example in the form of hinges, such as to be collapsible or foldable. The fold line can be understood as an imaginary line on which the pivot point(s) of the joint(s) lie(s).

According to one embodiment, the segments can be metal sheets and/or composite boards. Such a composite board can be understood as a composite of at least two boards made of the same material or of different materials, such as metal, wood, or (fiber-reinforced) plastic. Honeycomb segments are also conceivable.

Advantageous embodiments of the invention will be described below with reference to the accompanying drawings, wherein neither the drawings nor the description are intended to be interpreted as limiting the invention.

The drawings are merely schematic, and not to scale. Like reference signs refer in different drawings to like or analogous features.

DETAILED DESCRIPTION

Figure 1:
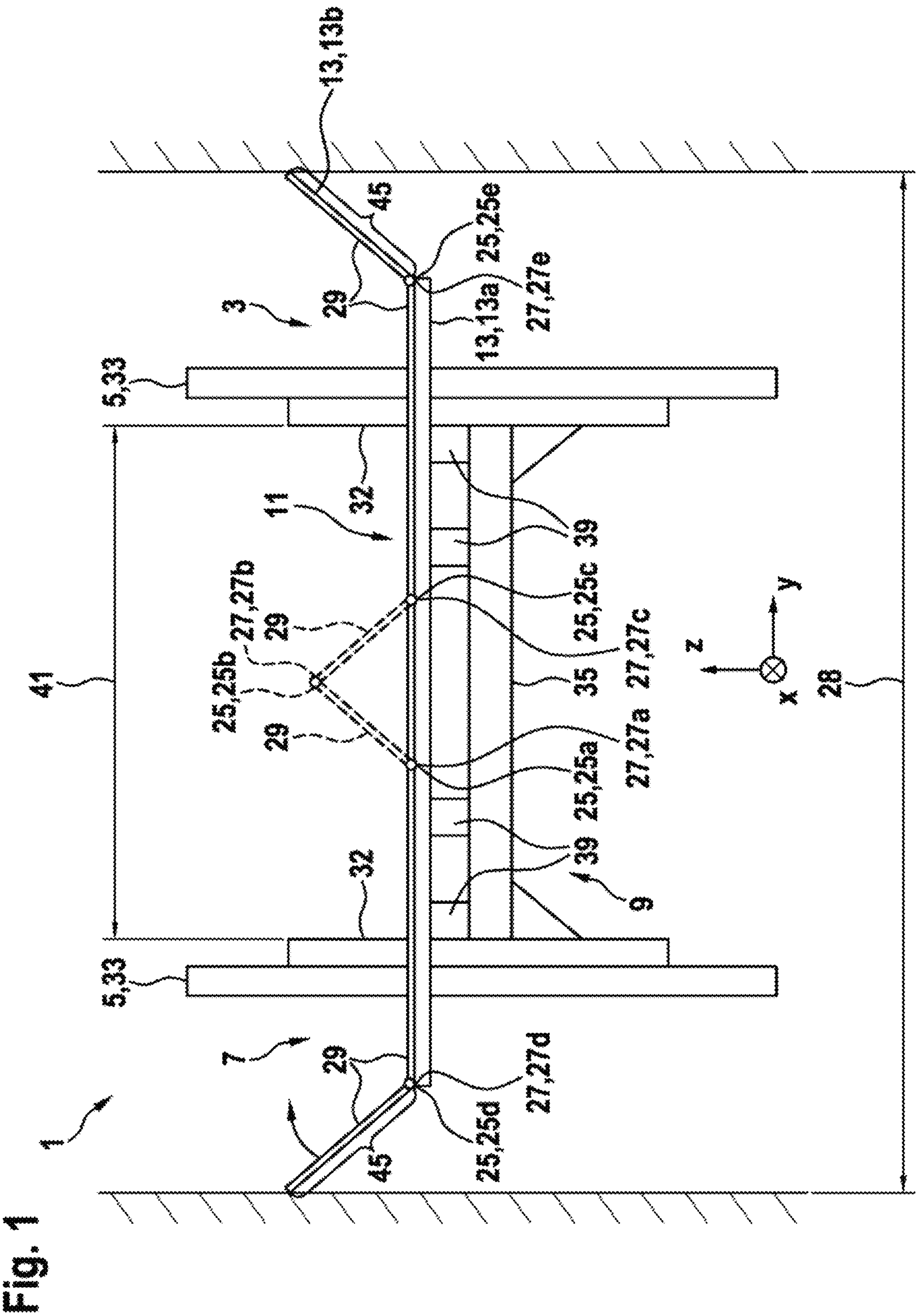
FIG. 1 shows a side view of a portion of an elevator system with an installed protective roof device according to one embodiment of the invention.

FIG. 1 shows a portion of an elevator system 1. The elevator system 1 comprises an elevator shaft 3 for receiving one or more elevator cars which are to be moved between the floors of a building, for example in order to transport people or goods.

The elevator system 1 can, for example, be designed as a so-called climbing elevator system which enables operation of the elevator system 1 still during the construction phase of the elevator shaft 3 or of the building. The elevator system 1 can be expanded toward the top in a z-direction with increasing length of the elevator shaft 3.

For this purpose, the elevator system 1 can comprise, for example, a rail system 5 which is installed in an already completed portion of the elevator shaft 3 and serves to guide the elevator car(s).

Additionally or alternatively, the rail system 5 can be designed to support and/or fix a protective roof device 7.

The protective roof device 7 comprises a protective roof support 9 which can be installed in different position in the z-direction, i.e., in the longitudinal direction of the elevator shaft 3.

A protective roof 11 is installed on the protective roof support 9 and is intended to catch objects falling down from above, i.e., to protect people or (construction) material located below the protective roof 11 in the already completed portion of the elevator shaft 3 from objects falling down.

The protective roof 11 is designed in at least two parts. In this example, the protective roof 11 comprises three protective roof parts 13, namely a central protective roof part 13*a* and two outer protective roof parts 13*b*, wherein the central protective roof part 13*a* is arranged between the outer protective roof parts 13*b* as seen in an x-direction.

Figure 2:
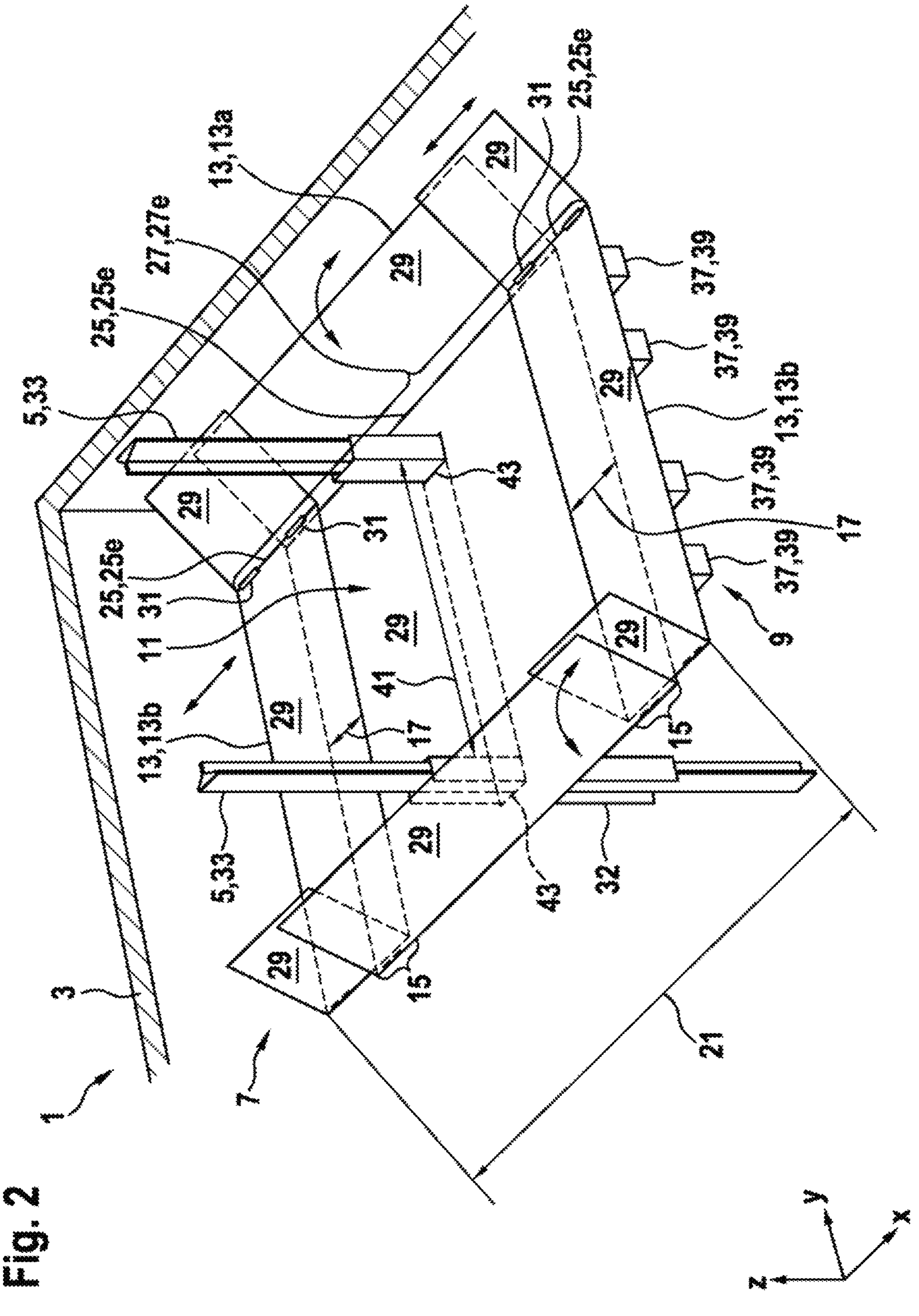
FIG. 2 shows a perspective view of a portion of an elevator system with an installed protective roof device according to one embodiment of the invention.

The three protective roof parts 13 can be arranged such that each outer protective roof part 13*b* overlaps the central protective roof part 13*a* in an overlap region 15 (see FIG. 2).

The protective roof parts 13 can be displaceable relative to one another in the x-direction, for example can be pushed into one another and/or one over the other.

Accordingly, a width 17 (see FIG. 2) of the overlap region 15, hereinafter referred to as overlap width 17, can be modifiable by displacing the respective outer protective roof part 13*b* relative to the central protective roof part 13*a*.

The central protective roof part 13*a* can, for example, be fixed in the x-direction.

By changing the overlap width 17, a width 21 (see FIG. 2) of the protective roof 11 changes to a corresponding degree in the x-direction, hereinafter also referred to as protective roof width 21. The protective roof width 21 can thus be adapted very easily to different widths of the elevator shaft 3 in the x-direction. The protective roof 11 is adaptable to the elevator shaft 3 relative to the x-direction such that it rests against the corresponding opposite side walls of the elevator shaft 3.

Furthermore, each protective roof part 13 can be folded along at least one fold line 25, wherein the fold line 25 runs substantially parallel to the x-direction or substantially orthogonal to a y-direction.

The protective roof parts 13 are arranged such that the protective roof 11 can be folded as a whole along at least one common fold line 27 that is substantially parallel to the x-direction. This can be achieved in that the individual fold lines 25 are aligned substantially collinearly with respect to one another during installation of the protective roof 11. The depth 28 of the protective roof 11 in the y-direction can thus be changed by corresponding folding (hereinafter referred to as protective roof depth 28) and adapted to the elevator shaft 3. The protective roof depth 28 can thus be adapted very easily to different depths of the elevator shaft 3 in the y-direction. The protective roof 11 is adaptable to the elevator shaft 3 relative to the y-direction such that it rests against the corresponding opposite side walls of the elevator shaft 3.

For example, as shown in FIG. 1, the protective roof parts 13 can each be foldable along a first fold line 25*a*, a second fold line 25*b*, a third fold line 25*c*, a fourth fold line 25*d* and a fifth fold line 25*e* and arranged such that the first fold lines 25*a* form a first common fold line 27*a*, the second fold lines 25*b* form a second common fold line 27*b*, the third fold lines 25*c* form a third common fold line 27*c*, the fourth fold lines 25*d* form a fourth common fold line 27*d*, and the fifth fold lines 25*e* form a fifth common fold line 27*e*. Each fold line 25*a* to 25*e* and each common fold line 27*a* to 27*e* can be substantially parallel to the x-direction. The protective roof depth 28 can thus be adapted by folding the protective roof 11 up to five times, which allows for a very flexible depth adjustment.

The protective roof 11 or the protective roof parts 13 can be folded, for example, by activating a suitable collapse mechanism which movably couples individual segments 29 of the protective roof parts 13 to one another.

The segments 29 can be designed to be comparatively rigid and should be sufficiently stable in order to also be able to reliably catch heavier objects, i.e., without the segments 29 being damaged or even penetrated by the objects. For example, each segment 29 can be a sheet metal part or a composite board made of several layers of the same material or different materials, for example a chipboard composite reinforced with metal sheet and/or plastic.

The collapse mechanism can, for example, be formed by hinges 31 (see FIG. 2) which connect adjacent segments 29 of the same protective roof part 13 to one another. However, other embodiments of the collapse mechanism are also feasible.

Figure 3:
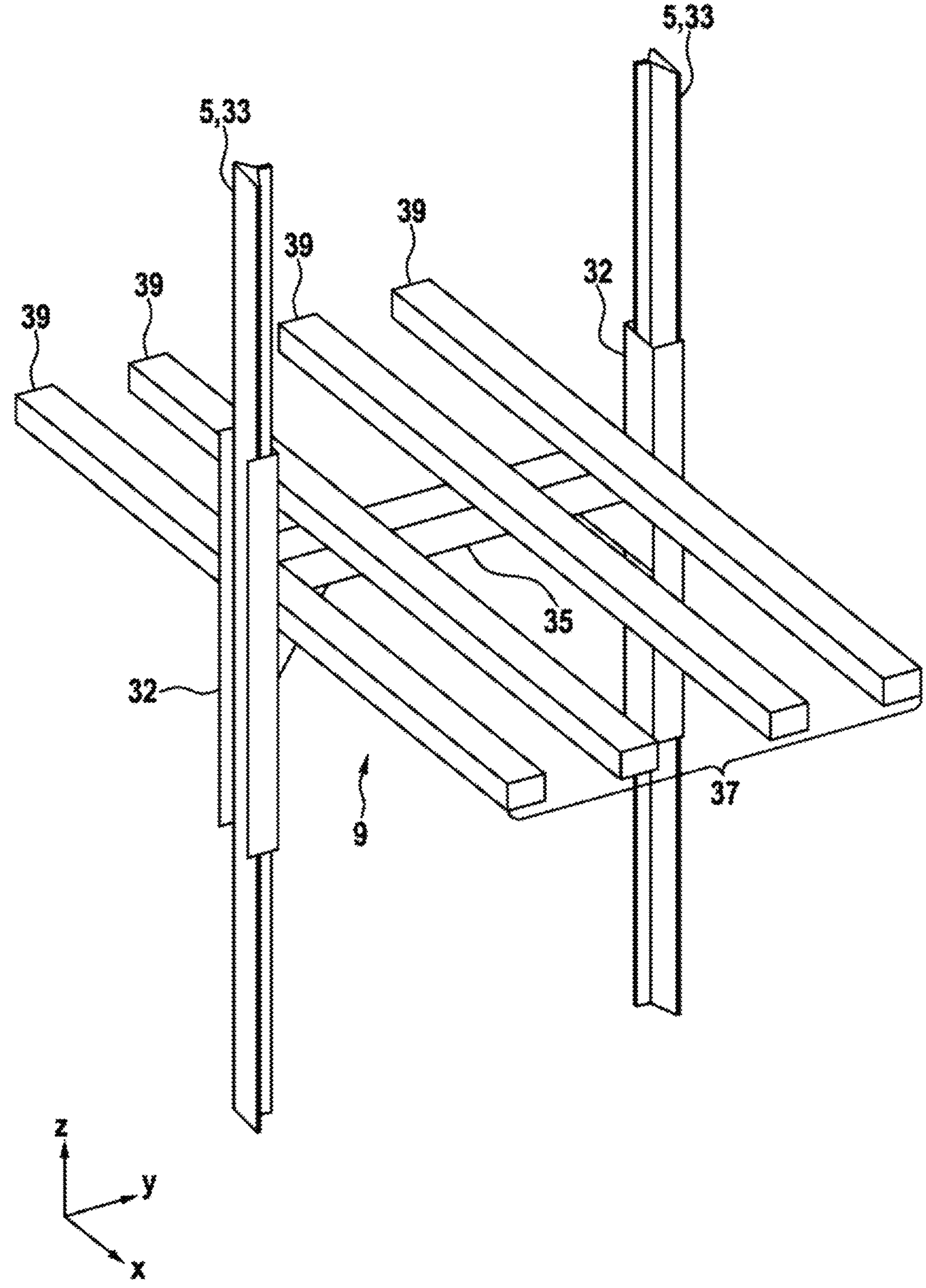
FIG. 3 shows a perspective view of a protective roof support of the protective roof device of FIG. 1 and FIG. 2.

As shown by way of example in FIG. 1, FIG. 2 and FIG. 3, the protective roof support 9 can have guide shoes 32 via which the protective roof support 9 can be displaceably mounted in the z-direction in the rail system 5.

In this example, the protective roof support 9 has two guide shoes 32 which are each displaceably mounted in the z-direction on one of two parallel guide rails 33 of the rail system 5.

The two guide shoes 32 can be rigidly connected to one another via a cross made of one or more cross members 35.

A protective roof platform 37 can be installed on the cross member(s) 35, for example in the form of a grid made of several parallel longitudinal members 39 or in the form of a frame. The protective roof 11 can be installed on the protective roof platform 37.

It is possible for an interspace 41 between the two guide shoes 32 or the two guide rails 33 to be completely or for the most part covered by the central protective roof part 13*a*.

For example, the central protective roof part 13*a* can have two guide shoe openings 43, through which one of the guide shoes 32 and, in addition, the associated guide rail 33 can be guided in each case.

The guide shoe openings 43 can be the only larger openings of the central protective roof part 13*a* and/or of the protective roof 11.

The first common fold line 27*a*, the second common fold line 27*b*, and the third common fold line 27*c* can each run through the interspace 41, as can be seen in FIG. 1.

For example, by folding the protective roof 11 accordingly within the interspace 41, a change in track width, i.e., a change in the distance between the two guide rails 33, can be compensated without having to remove the protective roof 11 from the protective roof support 9.

The fourth common fold line 27*d* and the fifth common fold line 27*e*, on the other hand, can run outside the interspace 41 on opposite sides of the protective roof 11 (see FIG. 1 and FIG. 2).

The protective roof 11 can thus have collapsible roof edges 45 which, in the installed state of the protective roof 11, can be supported on opposite side walls of the elevator shaft 3. The protective roof obviously has a trough-shaped cross section. This type of support allows for implementing the protective roof device 7 with substantially smaller dimensioned components, for example smaller profiles or metal sheets with a smaller sheet thickness.

Alternatively, a protective roof 11 is feasible which can be folded only along the fourth common fold line 27*d* and the fifth common fold line 27*e*, as shown in FIG. 2.

The protective roof 11 should expediently be adapted in terms of its width and depth such that its outer edges abut or rest against the respective side walls of the elevator shaft 3 in the x- and y-direction.

Finally, it should be noted that terms such as "having," "comprising," etc. do not exclude other elements or steps, and indefinite articles such as "a" or "an" do not exclude a plurality. Furthermore, it is noted that features or steps described with reference to one of the preceding embodiments can also be used in combination with features or steps described with reference to other of the above embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 Elevator system
3 Elevator shaft
5 Rail system
7 Protective roof device
9 Protective roof support
11 Protective roof
13 Protective roof part
13*a* Central protective roof part
13*b* Outer protective roof part
15 Overlap region
17 Width of the overlap region
21 Width of the protective roof
25 Fold line
25*a* First fold line
25*b* Second fold line
25*c* Third fold line
25*d* Fourth fold line
25*e* Fifth fold line
27 Common fold line
27*a* First common fold line
27*b* Second common fold line
27*c* Third common fold line
27*d* Fourth common fold line
27*e* Fifth common fold line
28 Depth of the protective roof
29 Segment
31 Collapse mechanism, hinge
32 Guide shoe
33 Guide rail
35 Cross member
37 Protective roof platform
39 Longitudinal member

41 Interspace

43 Guide shoe opening

45 Roof edge x x-direction y y-direction z z-direction, longitudinal direction of the elevator shaft

The invention claimed is:

1. A protective roof device for installation in an elevator shaft of an elevator system, the protective roof device comprising:

a protective roof support configured to be installed in the elevator shaft in different positions in a longitudinal direction of the elevator shaft in an installed configuration, the protective roof support being removably attached to a rail system positioned in the elevator shaft in the longitudinal direction thereof;

a protective roof supported by the protective roof support and configured to catch objects falling down the elevator shaft from above in the installed configuration;

wherein the protective roof includes a first protective roof part and a second protective roof part, the first and second protective roof parts overlapping at least partially in an overlap region, and wherein the first and second protective roof parts are moveable relative to one another in a displacement direction to change a width of the overlap region;

wherein the first and second protective roof parts are each foldable along an associated fold line and are arranged such that the fold lines form a common fold line that is parallel to the displacement direction;

wherein a width of the protective roof is adjustable in the displacement direction by changing the width of the overlap region to adapt the width of the protective roof to a width of the elevator shaft; and wherein a depth of the protective roof is adjustable and adaptable to a depth of the elevator shaft in a direction orthogonal to the displacement direction by folding the protective roof along the common fold line.

2. The protective roof device according to claim 1 wherein each of the first and second protective roof parts has at least two separate segments that are movably connected to one another via a collapse mechanism, and wherein each of the first and second protective roof parts are foldable along the associated fold lines by activating the collapse mechanism.

3. The protective roof device according to claim 2 wherein the segments are at least one of metal sheets or composite boards.

4. The protective roof device according to claim 1 including:

wherein the first protective roof part is a central protective roof part, the second protective roof part is a first outer protective roof part and including a second outer protective roof part, the central protective roof part being arranged between the first and second outer protective roof parts; and wherein the second outer protective roof part overlaps the central protective roof part at least partially in a second overlap region, the second outer protective roof part and the central protective roof part being moveable relative to one another in the displacement direction to change a width of the second overlap region.

5. The protective roof device according to claim 4 including:

wherein the common fold line is a first common fold line and the second outer protective roof part is foldable along a respective fold line that is included in the first common fold line;

wherein the central protective roof part and the first and second outer protective roof parts are each foldable along two additional fold lines that form a second common fold line and a third common fold line, the second common fold line and the third common fold line extending parallel to the displacement direction; and wherein the depth of the protective roof is adjustable by folding the protective roof along at least one of the first, second and third common fold lines.

6. The protective roof device according to claim 5 wherein the protective roof support includes two guide shoes adapted for displaceable mounting of the protective roof support in the rail system, and wherein the protective roof covers at least an interspace between the guide shoes.

7. The protective roof device according to claim 6 wherein the first common fold line, the second common fold line and the third common fold line each run through the interspace between the guide shoes.

8. The protective roof device according to claim 6 wherein the guide shoes are connected to one another via at least one cross member, and the at least one cross member supports a protective roof platform and the protective roof rests on the protective roof platform.

9. The protective roof device according to claim 6 including:

wherein the central protective roof part and the first and second outer protective roof parts are each foldable along another two fold lines that form a fourth common fold line and a fifth common fold line that are parallel to the displacement direction on opposite sides of the protective roof, the fourth and fifth common fold lines delimiting collapsible roof edges that are adapted to be folded and supported on side walls of the elevator shaft to adjust the depth of the protective roof to the depth of the elevator shaft; and wherein the guide shoes are arranged in an interspace between the fourth common fold line and the fifth common fold line.

10. The protective roof device according to claim 6 wherein the protective roof has guide shoe openings through each of which one of the guide shoes is guided.

11. The protective roof device according to claim 10 wherein the central protective roof part has the guide shoe openings formed therein.

12. An elevator system comprising:

the protective roof device according to claim 1;

the elevator shaft;

wherein the protective roof support of the protective roof device is installed in the elevator shaft in predetermined positions in the longitudinal direction of the elevator shaft; and wherein at least one of the width or the depth of the protective roof of the protective roof device is adjusted to at least one of the width or the depth of the elevator shaft such that objects falling down the elevator shaft from above the protective roof device are caught by the protective roof.

* * * * *